United States Patent [19]
Volk

[11] Patent Number: 5,181,880
[45] Date of Patent: Jan. 26, 1993

[54] METHOD AND APPARATUS FOR TRUSSING POULTRY

[76] Inventor: Henry J. Volk, 1863 Anning, Turlock, Calif. 95380

[21] Appl. No.: 822,647

[22] Filed: Jan. 21, 1992

Related U.S. Application Data

[63] Continuation-in-part of Ser. No. 723,444, Jun. 27, 1991, Pat. No. 5,102,370.

[51] Int. Cl.⁵ .............................................. A22C 21/00
[52] U.S. Cl. ..................................... 452/174; 452/176
[58] Field of Search ................... 452/174, 176, 198, 11

[56] References Cited
U.S. PATENT DOCUMENTS

| | | | |
|---|---|---|---|
| 1,980,904 | 11/1934 | Botz | 452/174 |
| 3,082,475 | 3/1963 | Belknap | 452/174 |
| 3,112,515 | 12/1963 | Volk | 452/174 |
| 3,188,212 | 6/1965 | Koonz et al. | 452/174 |
| 4,056,865 | 11/1977 | Cloyd | 452/174 |
| 4,615,075 | 10/1986 | Volk | 452/174 |
| 4,739,538 | 4/1988 | Volk | 452/174 |
| 5,102,370 | 4/1992 | Volk | 452/174 |

*Primary Examiner*—Willis Little
*Attorney, Agent, or Firm*—Bruce H. Johnsonbaugh

[57] ABSTRACT

A method and apparatus for trussing a turkey carcass is provided wherein the skin of the carcass is slit on either side of the evisceration cavity, exposed hocks are pushed through each of the slits, the hocks are pulled toward each other until they are adjacent and a cap is applied over the hocks to hold them together. In this fashion, a portion of the skin of the carcass is used to hold and anchor the hocks downwardly against the carcass.

2 Claims, 1 Drawing Sheet

METHOD AND APPARATUS FOR TRUSSING POULTRY

CROSS-REFERENCE TO RELATED APPLICATION

This application is a continuation-in-part of application Ser. No. 723,444 filed on Jun. 27, 1991 now U.S. Pat. No. 5,102,370.

SUMMARY OF THE INVENTION

This invention relates to a poultry trussing method and trussing apparatus. More particularly, the invention relates to a method and apparatus for trussing turkeys, wherein the trussing device is easily removed from the carcass.

The prior art trussing devices include the wire device shown in U.S. Pat. No. 3,112,515. This prior art wire device is somewhat time consuming to apply to the carcass, and time consuming to remove from the carcass. The wire, itself, is somewhat corrosive and some of the basting ingredients used have adverse effects on the wire. The prior art also includes a plastic device shown in U.S. Pat. No. 4,056,865 which is somewhat similar to the wire device shown in U.S. Pat. No. 3,112,515 in that it has arms which are anchored inside the carcass of the turkey and a center portion which extends around the hocks and pulls the hocks downwardly toward the tail.

The present invention provides a relatively simple plastic trussing device as taught in my co-pending application Ser. No. 723,444 which is used in conjunction with a pair of slits formed in the carcass on either side of the evisceration cavity.

A primary object of the invention is to provide a poultry trussing method and apparatus wherein the hocks of the carcass are efficiently trussed and wherein the trussing device may be readily removed from the carcass by the user.

Another object of the invention is to provide a poultry trussing method and apparatus wherein a "two-step" truss is achieved. By "two-stage" truss, I mean that the truss can be partially disengaged to allow the user to raise the hocks upwardly away from the carcass to stuff the carcass without disengaging the entire truss.

A further object of the invention is to provide a turkey trussing method wherein slits are formed in the skin of the carcass on either side of the evisceration cavity, the exposed hocks are pushed through the slits and held together by a flexible cap, wherein the skin of the carcass holds the exposed hocks close to the body of the carcass.

Other objects and advantages of the invention will become apparent from the following description of the preferred embodiment and the drawings wherein:

DETAILED DESCRIPTION OF THE DRAWINGS

Figure 1:
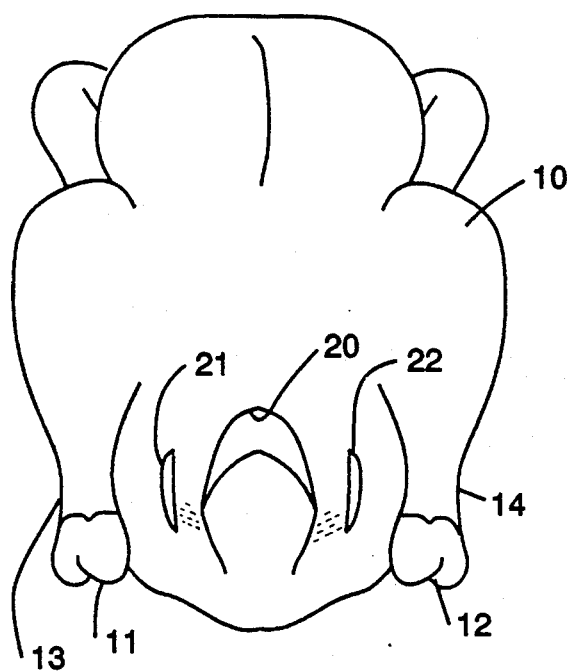
FIG. 1 is a perspective view of a poultry carcass, in this case a turkey carcass, showing the evisceration cavity and slits on either side of the cavity.

Referring to FIG. 1, a turkey carcass 10 is shown having a pair of exposed hocks 11 and 12 which extend from ankles 13 and 14, respectively. The carcass 10 has an evisceration cavity 20 from which the innards of the carcass are removed during processing. A pair of slits 21 and 22 are made through the skin of the carcass on either side of evisceration cavity 20. Each of slits 21 and 22 is approximately one inch long and is made approximately one inch away from the edge of evisceration cavity 20.

Figure 2:
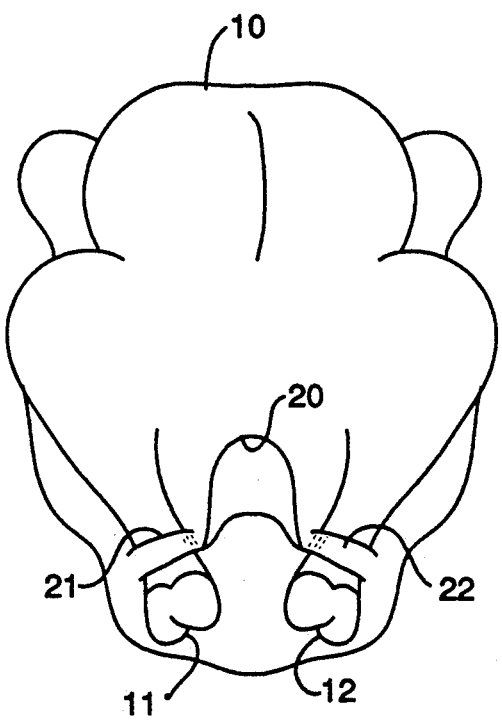
FIG. 2 is a perspective view of the turkey carcass wherein the exposed hocks have been pushed through the slits on either side of the evisceration cavity.

Referring to FIG. 2, the carcass 10 is shown wherein each of hocks 11 and 12 has been pushed through one of slits 21 and 22, respectively. In the position shown in FIG. 2, hocks 11 and 12 are held inwardly close to the body of carcass 10.

Figure 3:
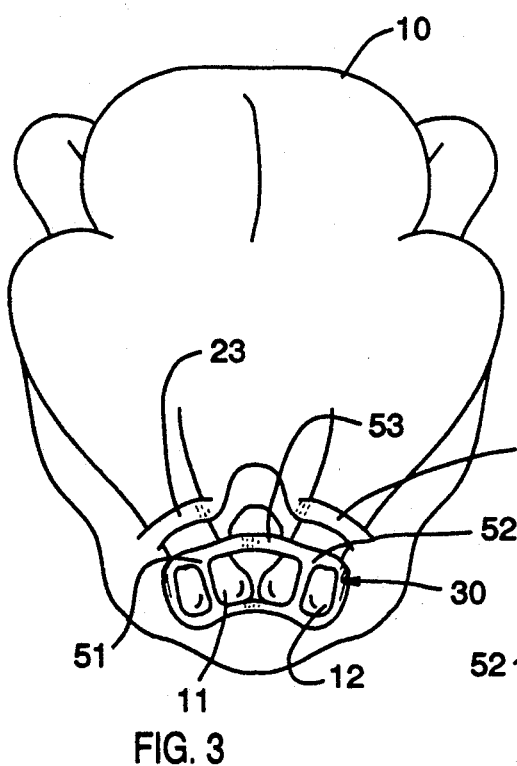
FIG. 3 is a perspective view of the turkey carcass wherein a cap has been applied over the exposed hocks to hold them together.
Figure 4:
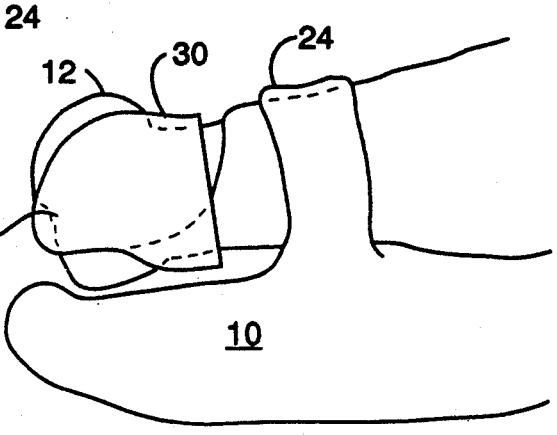
FIG. 4 is a side elevational view showing the turkey truss as applied.

Referring to FIG. 3, the carcass 10 is shown fully trussed. The hocks 11 and 12 have been pulled toward each other until they either touch or are closely adjacent each other, at which point a plastic cap 30 is applied over hocks 11 and 12 to hold them together. Plastic cap 30, as shown in FIGS. 3 and 4, is identical to the "snap-on" trussing device 30, shown in my co-pending application Ser. No. 723,444 filed Jun. 27, 1991. The "snap-on" cap or truss 30 comprises a pair of resilient socket means 51 and 52 wherein each socket means is expanded to pass over an exposed hock and then contracts to grasp an ankle, as shown best in FIG. 4. A connecting means 53 joins sockets 51 and 52 together.

As shown in FIG. 3, sections of skin 23 and 24 extend over ankles 13 and 14, respectively, and hold the ankles downwardly against carcass 10. A user may cut the sections of skin 23 and 24, which allows hocks 11 and 12 to be raised so that the carcass may be stuffed. The "snap-on" cap or trussing device 30 may be left in place while hocks 11 and 12 are being raised. In this fashion, a "two-stage" truss is provided.

I claim:

1. In combination:
    a poultry carcass which has the hocks exposed, wherein each hock extends from an ankle, wherein said carcass has been eviscerated and two slits have been formed in the skin of the carcass on either side of the evisceration cavity, and wherein each of said hocks has been pushed through one of said slits;
    a pair of resilient socket means, wherein each socket means is expanded to pass over an exposed hock and then contracts to grasp an ankle, and
    connecting means for joining said pair of resilient socket means.

2. A method for trussing a poultry carcass wherein said carcass has the hocks exposed, wherein said carcass has been eviscerated and has an evisceration cavity, comprising the steps:
    slitting the skin of said carcass on either side of said evisceration cavity,
    pushing each of said hocks through one of said slits,
    pulling said hocks toward each other until they are adjacent, and
    applying a cap over said hocks to hold them together.

* * * * *